Oct. 28, 1969 P. A. CAIN 3,474,956

OPERATION CHECKING ARRANGEMENT

Filed June 15, 1966 4 Sheets-Sheet 1

Inventor:
Pierre Arsène Cain
BY Baldwin, Wight, Diller & Brown
Attorneys

Inventor:
Pierre Arsène Cain
BY Baldwin, Wight, Diller & Brown
Attorneys

OPERATION CHECKING ARRANGEMENT

Inventor:
Pierre Arsène Cain
BY Baldwin, Wight, Diller & Brown
Attorneys

Oct. 28, 1969 P. A. CAIN 3,474,956

OPERATION CHECKING ARRANGEMENT

Filed June 15, 1966 4 Sheets-Sheet 4

Inventor:
Pierre Arsène Cain
BY Baldwin, Wight, Diller & Brown
Attorneys

United States Patent Office 3,474,956

Patented Oct. 28, 1969

3,474,956

OPERATION CHECKING ARRANGEMENT

Pierre Arsène Cain, Maisons-Laffittte, France, assignor to Societe Industrielle Bull-General Electric (Societe Anonyme), Paris, France Filed June 15, 1966, Ser. No. 557,776
Claims priority, application France, July 21, 1965, 25,481
Int. Cl. G06k *1/04*
U.S. Cl. 234—34 4 Claims

ABSTRACT OF THE DISCLOSURE

In a recording machine, such as a punching machine, one or more of several punch electromagnets may concurrently be energized by a corresponding number of control pulses, which are further applied to a first parity checking device. Other pulses emitted in accordance with the number of punch members effectively actuated are applied to a second parity checking device. A comparing device can detect faulty operation when the outputs of both parity checking devices differ.

The present invention relates to improvements in monitoring means for checking the correct operation of recording devices in recording machines, in response to electric recording control signals.

In recording machines such as card or tape punching machines, printing machines or like cyclically operating machines, a number of punching or printing recording devices may be actuated either simultaneously or at variable instants in a given space of time in a machine cycle for recording data in the form of perforations, marks, characters or signs applied to a recording medium such as a record sheet, card or tape, in response to electric recording control signals or pulses transmitted to the said machine.

The invention concerns simple and advantages means which are more particularly adapted for checking the correct operation of recording devices in recording machines such as punching machines, printing machines or like cyclically operating machines in which a number of recording devices, of which the number may vary in each cycle, are actuated in response to an equal number of electric recording control signals transmitted to the said machine in a given space of time. An example of the application of the invention will be described in an embodiment adapted to check the correct operation of the punching devices in a record-card punching machine, but any person skilled in the design of recording machines, more particularly such as "peripheral" machines for data recording, in modern electronic data-processing equipment, will see that the means described are also applicable substantially without modification of principle to the checking of the correct operation of the striker mechanisms of various machines, more particularly of drum printing machines of known type. In order to check the correct operation of the recording devices in such machines, it has often been thought advantageous to provide a number of monitoring means employed simultaneously to check in various ways the operation of the controlled recording devices. This has led to the provision of monitoring means which have generally been complex, fragile and costly, and the failures of which in some cases have become more frequent than those of the monitored devices. Disadvantages of this type are even to be expected with monitoring devices comprising electric contacts arranged to be closed (or opened) in step with the movement of the monitored recording members. These disadvantages have been partially obviated by replacing electric contacts by electromagnetic devices arranged to produce inductively an electric monitoring pulse for each actuated recording device. Electric circuits having variable inductive coupling have also been proposed, but these devices, which are often very difficult to adjust, do not operate in a stable manner in high-speed machines from which intensive performance is required. The present invention relates to simple and reliable monitoring means of economic construction by means of which these disadvantages can be obviated and which are capable of carrying out an effective monitoring of the recording devices of a machine.

As a result of the progress which has taken place in the design of photo-electric devices of small dimensions which are employed more particularly for scanning perforations in record cards or tapes or for various monitoring functions in recording machines, there are now available simple and robust photo-electric elements which are easy and economical to use. In a recording machine provided with monitoring means designed in accordance with the invention, the movements of a mechanical member of each recording device are preferably monitored by means of a photo-electric device comprising a masking, reflecting or other member which modifies the conditions of transmission of the light rays of a photo-electric device, in direct or indirect relation to the movement of a member of a recording device. The actuation of one or more of the said recording means in the course of a cycle, in response to electric control signals transmitted to the said machines, is verified by the result of the comparison of the information supplied by two parity-checking devices, one of which receives the control signals for the recording, while the other receives signals produced by the devices monitoring the actuated recording devices. The invention also makes it possible to use parity-checking devices for verifying the correct operation of recording devices, the number and parity of which may vary in each cycle, and also makes it possible to check in known manner the parity of the control signals received by the machine, when this check can be used as a parity check.

Further advantages and features of the invention will become more clearly apparent in the course of the following description, with reference to the accompanying drawings, in which.

Figure 1:
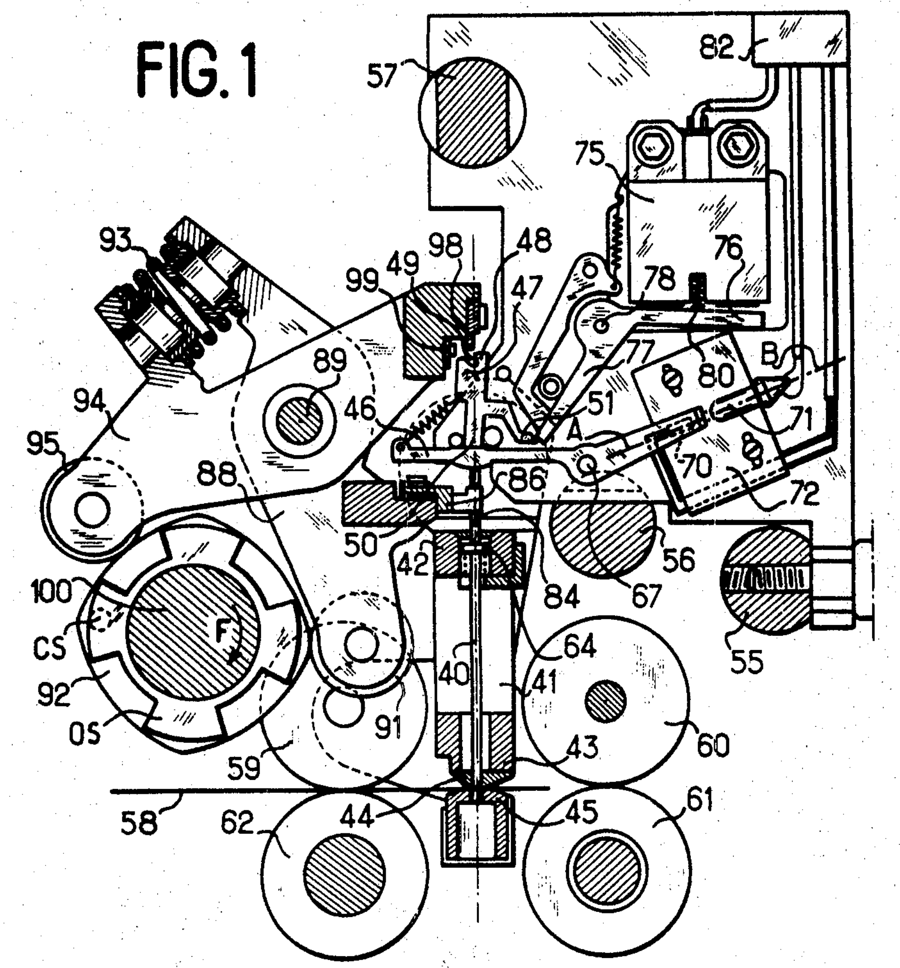
FIGURE 1 is a sectional view through the punching mechanism of a punching machine, showing a punching device provided with monitoring means designed in accordance with the invention.

The invention will be described as applied to the checking of the correct operation of the punching devices of a high-speed punching machine, operating on record cards, under the control of electric pulses transmitted by an electronic data-processing unit. However, as stated, it will readily be seen that the means described are readily adaptable to the checking of the correct operation of tape punchers, of printing machines or of like machines. In practice, a tape puncher comprises a row of punching devices, the number of which may vary from five to eight according to the type of tape employed. A record-card punching machine operating column-by-column comprises a row of twelve punching devices adapted to be actuated selectively, while a machine operating line-by-line generally comprises twenty-four such devices. The construction of the punching device illustrated in FIGURE 1 is derived from a known mechanism which has been described in United States patent specification No. 3,017,077 for "Device for Advancing Record Cards in Record Card Controlled Machines."

Figure 2:
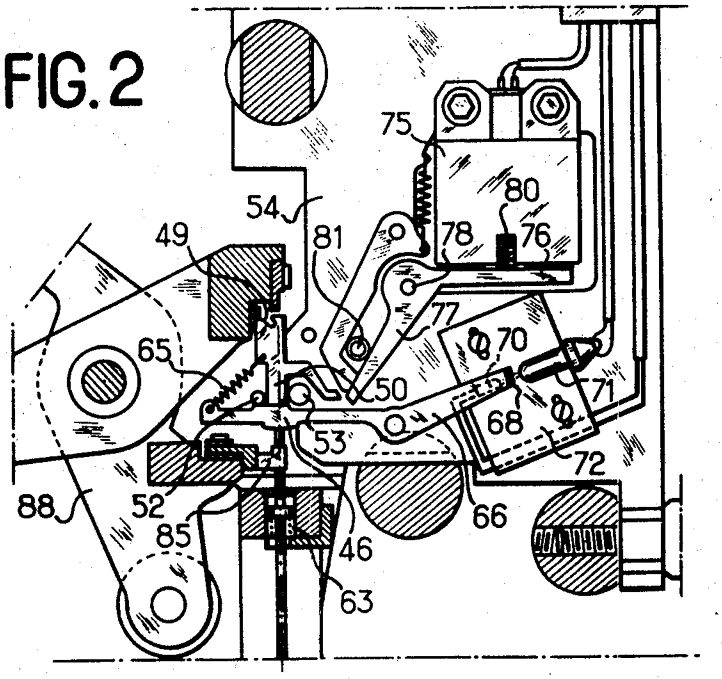
FIGURES 2 and 3 show a part of FIGURE 1, illustrating the punching device in two other operating positions.

This device is one of the twelve punching devices of a machine operating column-by-column, each device being separately controlled to punch a hole in one of the twelve recording positions of a column of cards. The punch 40 of the punching device of FIGURE 1 is guided in a punch support 41 which is provided in its upper part with guide means 42 and in its lower part with guide means 43 adapted to guide along a line all the punches of the punching mechanism. A lower guide plate 44 is specially adapted to guide with precision the engagement of each of the said punches in one of the apertures of a die 45 fast with the support 41. Means are provided to advance record cards in the punching mechanism, either step-by-step or with a continuous movement, depending upon whether the row of punches is fixed in the machine or is actuated, together with the die, with an oscillatory movement which enables the card to be punched, while accompanying it, in known manner. In FIGURE 1, the card 58 is advanced between the punches and the die by rollers 59, 60, 61 and 62. The card feed, positioning and ejecting devices are known and do not form part of the invention, and they will therefore not be described. However, for a good understanding of the monitoring functions performed in the invention, the actuating controls and the actuation of a punching device of the machine will be described. In order to facilitate the reading of the drawings, references relating to various elements of the punching device of FIGURE 1 have been shown in FIGURES 2 and 3, which illustrate the same device in different operating positions.

Disposed above the punch 40 (FIGURE 1) is an intermediate lever 46, on which there rests a latch 47 formed with a head 48, a recess 49, a heel 50 and a lug 51. The heel of the latch is guided between two fixed dogs 52 and 53 (FIGURE 2) connected to a support plate 54, which supports the latch mechanism controlling the actuation of the punch 40 and the means for controlling the latch. The punching devices of the machine each comprise a similar plate and the said plates are supported and maintained in position in the machine by means of fixed support bars 55, 56 and 57 connected to the frame of the machine.

The latch 47 is urged towards the left in the drawing by a spring 65 which is secured on the one hand to the said latch and on the other hand to the lever 46. The said lever is extended by an arm 66 and is adapted to pivot about a pin 67 fixed on the plate 54. The end of the arm 66 is provided with a flap 68 arranged to form a screen between a photo-electric cell 70 and an electric lamp 71, which are mounted on an insulating support 72, which is movable and adjustable on the support plate 54. An electromagnet 75 also mounted on the support plate 54 is arranged to be able to attract a magnetic blade 76 when it is energised. This blade is connected to a lever 77 and pivots about a fixed pin 78. A return spring 80 disposed in a seat between the frame members of the electromagnet 75 forces back the blade 76, which pushes the lever 77 against a fixed stop 81. The electric conductors of the electromagnet, of the photoelectric cell and of the lamp are connected to a connecting plate 82, which is in turn connected to the plate 54.

Figure 5:
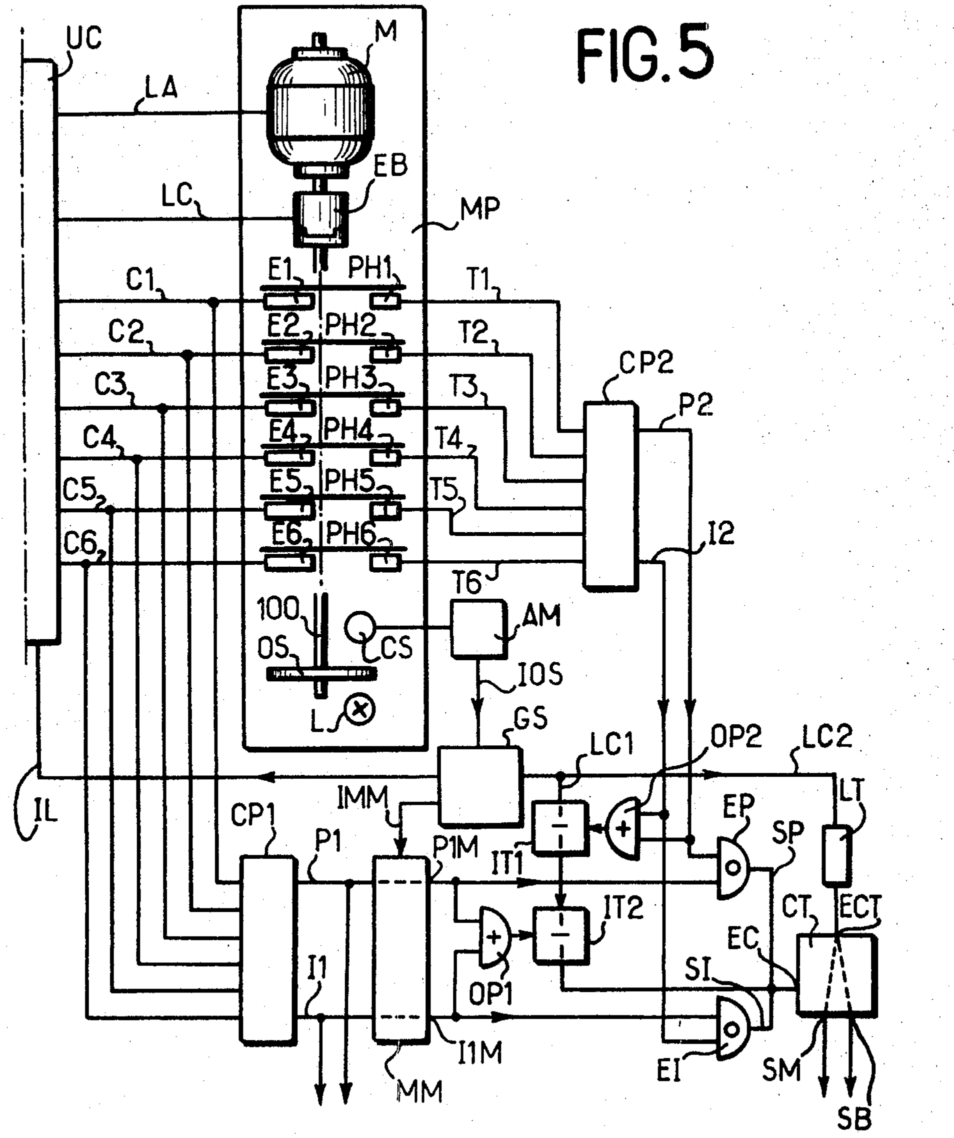
FIGURE 5 is the basic circuit diagram of the electric connections between the main elements of a monitoring unit according to the invention.

Each punch is formed with a recess 84 in its upper part, in which recess there is engaged an extracting dog 85 connected to an extracting bar 86, which is fixedly mounted on a lever 88, which is adapted to oscillate about a fixed pin 89. A return spring 63 disposed in the support 42 forces upwards a ring 64 connected to the punch. The lever 88 is provided with a roller 91 which is urged against a cam 92 under the action of a spring 93. Disposed above the latches of the punching mechanism is a punching bar 98 connected to a lever 94, which also oscillates about the pin 89, and is provided with a roller 95 maintained in contact with the cam 92 under the action of the spring 93. The lever 94 also supports a stop plate 99, against which latches of the punching mechanism can bear as will hereinafter be described. The cam 92 is provided with four bosses arranged to act successively on the rollers 91 and 95 of the levers 88 and 94. The said cam is connected to a shaft 100 actuated with a continuous rotational movement under the action of a motor M through an electromagnetic clutch EB (FIGURE 5). There correspond to each revolution of the shaft 100 four punching mechanism cycles. For the sake of simplicity of construction of the machine, a different cam may be provided for each of the rollers 91 and 95. In this case, the two cams against which the two rollers bear have a slightly different profile and are mounted on the same shaft 100, at an angular distance apart which ensures correct operation of the punching bar 98 and of the extracting bar 86. The motor M is supplied with electric current (FIGURE 5) through a supply circuit LA, for example with polyphase current supplied by a monitoring unit UC under conditions which generally ensure synchronous operation between the motor of the punching machine and a number of peripheral units (card or tape readers, card or tape punchers, printing machines, etc.) which supply data or register the results emanating from an electronic computer. The electro-magnetic clutch EB is also controlled through a control line LC and controls in known manner the starting and stopping of the punching machine.

Figure 6:
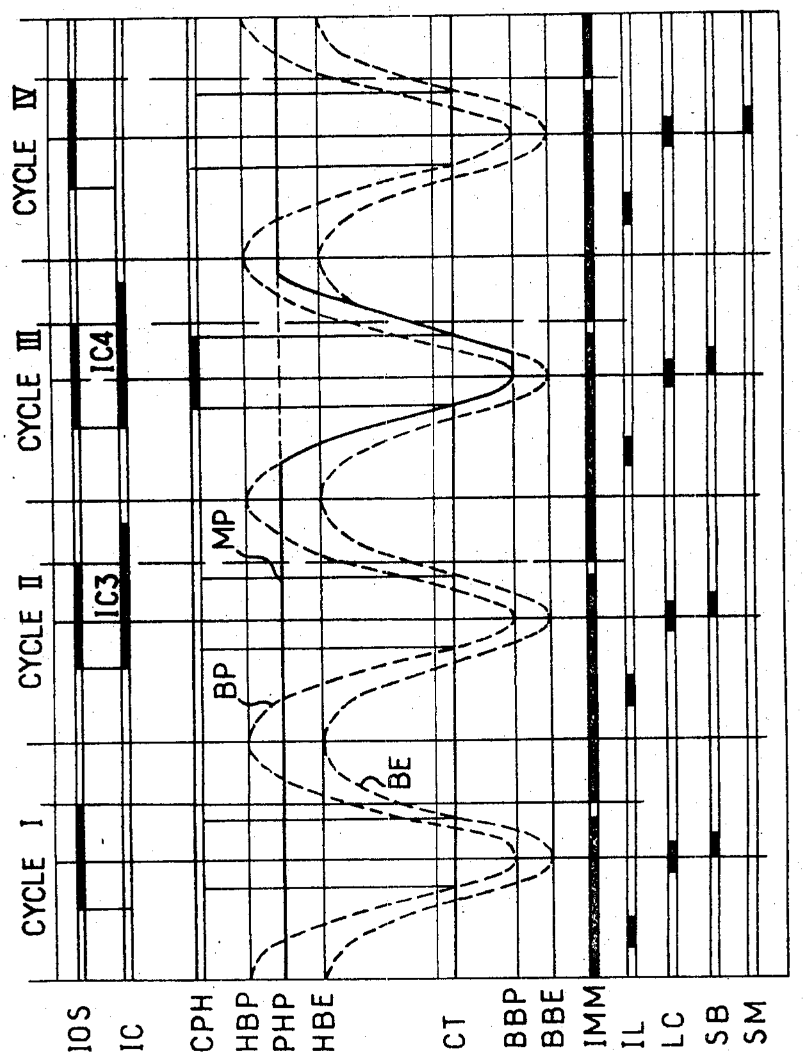
FIGURE 6 is a diagram showing the movements of various members of a punching device and the distribution in time of electric control signals and of monitoring signals in the course of a number of successive cycles in a machine.

The curve BP of the diagram of FIGURE 6 shows the relative movements of the punching bar 98 in the course of a number of successive cycles of the machine, between its upper dead-centre position HBP and its lower dead-centre position BBP. The curve BE shows the movements of the extracting bar 86, which moves between its upper dead-centre position HBE and its lower dead-centre position BBE, while the curve MP of the movements of the punch shows that the latter can be shifted from its upper dead-centre position PHP to its lower dead-centre position BBP which, in the diagram, corresponds to the lower dead-centre position of the punching bar. The difference in amplitude of the movements of the punching bar and of the extracting bar which is apparent from the said diagram is a result of differences in the lengths of the levers 88 and 94. A photo-electric synchronising device is provided with a shutter OS mounted on the shaft 100 (FIGURES 1 and 5). This device comprises (FIGURE 5) a photo-electric cell CS and a lamp L arranged on either side of the shutter. The cell CS is connected to a synchronising generator GS which is controlled through an amplifier AM of known type.

When the shaft 100 is rotating in the direction of the arrow F and the punching device illustrated in FIGURE 1 is in the position illustrated in this figure, the lug 51 of the latch 47 is retained by the end of the lever 77 and the latch 47 is maintained in this position while the punching bar 98 is vertically reciprocated in front of the head 48 of the latch, while the dog 85 of the extracting bar 86 moves vertically in the recess 84 in the punch 40 without acting on the latter, the said punch being maintained in the upper position, against the lever 46, under the action of the return spring 63.

The lamp 71 of the photo-electric control device of the punching device of FIGURE 1 being ignited, the screen 68 of the lever 66 is disposed between the photo-electric cell 70 and the said lamp so as to prevent the light from this lamp from reaching the cell. Considering the punching device operating at very low speed, i.e. without having to take account of the delays introduced into the effective movements of the mechanical members owing to their inertia at high speeds, and with the punching bar 98 in the upper position, for example, an electric punching control pulse is applied to the coils of the electromagnet 75, the plate 76 is attracted by the latter, the lever 77 is lowered, the latch 47 urged by the spring 65 bears against the stop plate 99, and the head 48 of the latch is positioned under the punching bar 98 (FIGURE 2), whereafter the downward movement of the punching bar lowers the latch and the lever 46 (FIGURE 3), so that the lower end of the punch is engaged in the punching die. During the lowering of the lever 46, the lever 66 is lifted, and the cell 70 can receive the light emanating from the lamp 71, while the punch punches a hole in a card. The light from the lamp 71 influences the cell 70 for a time CPH (cycle III, FIGURE 6). The punch 40 is thereafter lifted under the action of the dog 85 of the extracting bar and is then maintained in this position by its return spring 63. At the same time, the lever 46–66 is returned into the position of FIGURE 1. During the upward movement of the latch 47, the lug 51 of the latter is retained by the end of the lever 77, which has returned to the rest position against the stop 81, and the latch, which is rocked to the right, is returned into the position illustrated in FIGURE 1, i.e. into the position in which the head 48 of the said latch is no longer in the path of the punching bar. However, if the electromagnet 75 is energised at this instant, so that the lug 51 of the latch is no longer retained by the lever 77, the latch remains under the bar 98 and will be lowered by the latter to produce a perforation in the succeeding column of the card. If, on the other hand, the latch is disengaged from the lever 77, after the bar 98 has started to descend, the head 48 of the said latch cannot take up a position under the said punching bar 98, but it is then positioned under the said bar by the action of the spring 65. However, the punching bar can descend in the recess 49 in the latch without acting on the latter and it is only after the upward movement of the bar that the head of the latch can take up a position below the latter for punching a hole. This arrangement performs the function of a mechanical memory for the punching control pulses acting on the latch after the punching bar has started to descend. This affords great latitude in time for the transmission of the control pulses in a cycle and even enables the said pulses to be time-graded.

Figure 3:
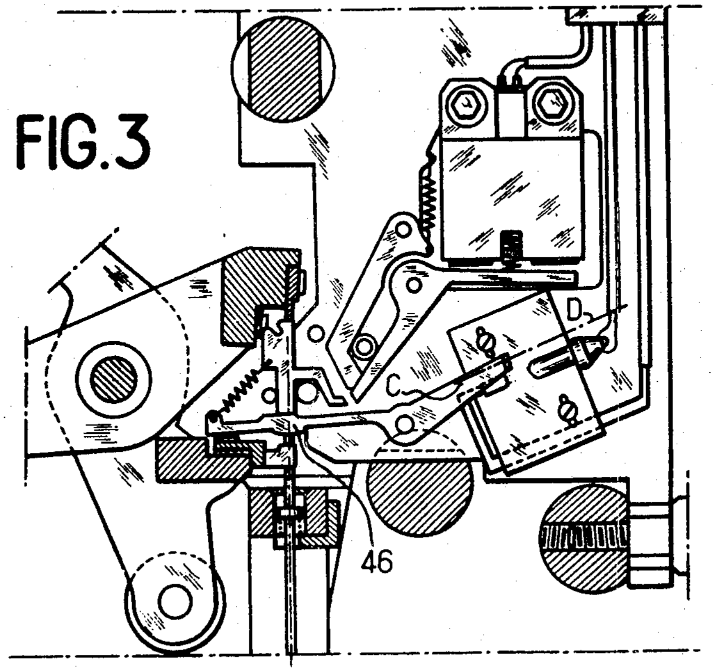

In FIGURE 1, the lamp 71 and the photo-electric cell 70 are disposed on an axis A–B whose position is adjustable in such manner that the light ray from the lamp 71 is intercepted by the screen 68 at an exact moment in the travel of the punch. Various considerations may show that it is more advantageous to effect the monitoring of the operation of the device by interception of the light ray at a particular instant when the punching device is actuated. In this case, the lamp and the cell are disposed on an axis C–D (FIGURE 3).

Figure 4:
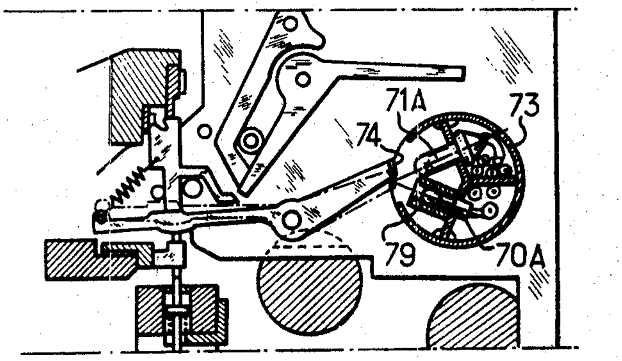
FIGURE 4 illustrates a variant of the construction of the photo-electric device.

FIGURE 4 illustrates a constructional variant of the photo-electric monitoring device. In this case, the light is transmitted from the lamp to the cell by way of a reflecting screen 74, the light from the lamp 71A not being able to reach the photo-electric cell 70A otherwise than by way of the reflecting screen. In the construction of FIGURE 4, the lamps and the photo-electric cells of the monitoring devices are mounted on a support tube

73 which also contains the circuits of the lamps and of the cells. Each cell is protected by a screen tube 79 so disposed that the said cell can receive the light from the lamp only by way of the reflecting screen. In FIGURE 4, the lamp and the cell are so disposed that light is transmitted from the lamp to the cell as long as the punch is in the rest position (upper position). It will be readily seen from FIGURE 4 that, if the photo-electric cell is disposed a few millimetres higher, the inverse condition is obtained, namely that transmission of light takes place only when the punch is brought into the bottom position. Any skilled person can readily provide, by simple application of known means, an amplifier adapted to produce, from the described photo-electric devices, electric pulses which have, for example, the shape indicated at CPH (cycle III, FIGURE 6).

In the monitoring means which are now to be described, two complementary checks will be considered. The first check enables the non-operation of a controlled punching device and the accidental operation of a non-controlled device to be detected, while the second check enables the accidental operation of a punching device in the absence of any control pulse to be detected. These arrangements also indicate as an error in operation the case where the photoelectric device for checking the operation of a punching device is not in the operational condition. It may be argued that the monitoring means proposed in the present invention do not afford an absolute check on the operation (or the non-operation) of the monitored devices, and that errors in operation which offset one another would not be signalled. Such an eventuality may be regarded as possible, but so improbable that it may be disregarded, and the use of additional monitoring means which would remain substantially unused may thus be avoided.

In order to simplify the basic diagram of FIGURE 5, there have been illustrated the main elements of a punching mechanism MP comprising only 6 punching devices, the principles set forth remaining the same regardless of the number of monitored punching devices. The punching mechanism illustrated therefore comprises the six electromagnets E1, E2 . . . E5 and E6, which control respectively the six punching devices, one of them corresponding to the electromagnet 75 of the device illustrated in FIGURES 1 to 4. The photo-electric monitoring devices of the six punching devices each comprise a photo-electric cell PH1, PH2 . . . PH5 and PH6, one of which corresponds to the photo-electric cell 71 of FIGURES 1 to 3. Recording control signals are transmitted to the punching devices from a central unit UC which may comprise a card or perforated-tape reader, memories or computing devices. The electromagnets E1 to E6 receive these signals through connecting lines C1, C2 . . . C5 and C6. These lines are also connected to the inputs of a first parity checking device CP1. The various elements (parity checking devices, memories, circuits, logical circuits, interrupters, switches, etc.) illustrated in the diagram of FIGURE 5 may be constructed in various forms, depending upon circumstances, from relays, tubes, transistors, diodes, magnetic-core circuits, etc., by simple application of known means, and they will not be described because they do not separately form part of the invention. Various considerations, the main one of which will be the speed of operation of the recording devices employed, may determine the nature of the circuit elements (relays or electronic elements) chosen for the construction of the various parts of a monitoring unit. Thus, for example, the parity checking device CP1 may consist of a simple bistable trigger circuit comprising one symmetrical input and two outputs, and to the input of which there is connected a buffer circuit of known type comprising one output and a number of inputs equal to the number of pulses simultaneously supplied by the monitoring unit UC. In this case, delay elements of different values are disposed at each of the inputs of the buffer to receive the pulses applied in parallel to the connecting lines C1 to C6 and to delay them in such way that they are transmitted in series to the trigger circuit through the buffer circuit.

The photo-electric cells PH1 to PH6 of the devices for monitoring the punching devices are connected (FIGURE 5) respectively to the inputs of a second parity checking device CP2 by means of transmission lines T1 to T6. Each parity checking device is provided with outputs P1 and I1 (for CP1) and P2 and I2 (for CP2) respectively. Voltage is applied to either one of these outputs, depending upon whether the number of inputs of the parity checking device to which voltage has been temporarily applied in the course of a cycle is even (outputs P) or odd (outputs I). The outputs P1 and P2 of the two parity checking devices are both connected to the inputs of a first logical coincidence-checking circuit EP, the output SP of which is under voltage when the two inputs of the said circuit are simultaneously under voltage. The outputs I1 and I2 of the parity checking devices are connected to the inputs of a second coincidence-checking circuit EI whose output SI is under voltage when the outputs I1 and I2 are simultaneously under voltage. The outputs SP and SI of the coincidence-checking circuits EP and EI are connected through a control input EC of a switch CT which is so arranged that when a voltage is applied through the input ECT of the said switch, a voltage is set up at an output SB or at an output SM, depending upon whether the control input EC of the switch is under voltage or not. A voltage set up at the output SB of the switch indicates satisfactory operation of the machine, while a voltage set up at the output SM indicates defective operation and may cause, for example, stoppage of the machine. The means described and diagrammatically illustrated in FIGURE 5 permit of monitoring the operation of a record-card punching machine operating at more than 100 cycles per second. The mechanical control members respond with some delay to the action of the electric control pulses transmitted thereto and, in the case under consideration, as will hereinafter be seen, the said electric control pulses must be transmitted to the punching mechanism in the course of the cycle preceding a cycle with punching operation. For this purpose, it is necessary to store either the control pulses which have been transmitted or the data supplied by the parity checking device which has received the control pulses. This second arrangement, which is considered more advantageous, is formed in FIGURE 5 of a memory MM disposed at the output of the parity checking device CP1. No memory would be required in slower machines or machines having a more rapid response in which the control pulses and the checking pulses could overlap in time by a sufficient duration to permit of comparing them.

A synchronising generator GS receives at each cycle, through an amplifier AM, synchronising control pulses IOS (see FIGURE 6) emanating from the photo-electric cell CS influenced by the lamp L through the synchronising shutter OS of the punching mechanism. Under the control of these pulses, the synchronising generator GS transmits at each cycle, through different lines, synchronising pulses of different shapes. Pulses IMM (FIGURE 6) are sent by the said generator through a line IMM (FIGURE 5) for maintaining at the outputs of the memory MM the result of the parity checking of the recording control pulses transmitted, for example, during the time IC3 (cycle II), this maintenance being continued until the monitoring of the perforation made during the time CPH of the cycle III. Monitor-read pulses LC are transmitted by the said generator during the perforation monitoring along the line LC1 and along the line LC2. The pulses LC are sent through the line LC1 to the control input EC of the switch CT, through a first interrupter IT1, which is under the control of any pulses emanating from either of the outputs of the parity checking device CP2, through a logical buffer circuit OP2, in order to prevent such a pulse LC from passing through the said first interrupter. The pulses LC must also enter a second interrupter IT2, which is controlled by pulses which may emanate from either one of the outputs of the parity checking device CP1 (through the memory MM) by way of a logical buffer circuit OP1, in order to prevent a pulse LC from passing to the switch CT. A delay line LT inserted in the line LC2 delays the pulses LC which are transmitted to the input ECT of the switch CT and thereafter appear at one of its outputs SM or SB. The generator GS may also transmit pulses IL at each cycle to the central unit UC, for example for checking the state of operation of the punching machine or for synchronising the transfer, to the said puncher, of recording control pulses emanating from the step-by-step reading of a data store.

Various cases of operation will be examined, in the course of a number of successive cycles, with reference to the diagram of FIGURE 6 and to FIGURES 1 to 5.

Cycle I.—The electromagnetic clutch EB (FIGURE 5) being energised through the line LC, the shaft 100 of the punching mechanism is in rotation. At the beginning of the cycle, a pulse IMM for maintaining the memory MM is prolonged without effect in the cycle, the said memory being empty. A pulse IL is transmitted from the synchronising generator GS to the central unit UC through the line IL in order to trigger (where necessary) during the time IC the dispatch of recording control pulses to the punching mechanism. There are none in the cycle I. Therefore, no pulse is set up along the lines C1 to C6, nor at the inputs of the parity checking device CP1. If everything is normal, no checking pulses will be set up at the inputs of CP2. Since the shaft 100 is rotating, the synchronising shutter OS effects the transmission of a pulse IOS (FIGURE 6) by the amplifier AM (FIGURE 5) to the synchronising generator GS, which will produce another pulse IMM as soon as the pulse IOS of the first cycle has ended, and will be prolonged for a portion of the second cycle. During this time (1st cycle), a checking pulse LC is transmitted by GS along the lines LC1 and LC2. Since the interrupters IT1 and IT2 do not receive any interruption control pulses emanating from P1, I1, P2, or I2 through the logical circuits OP1 and OP2, the pulse LC, passed along the line LC1, may reach the control input EC of the output switch CT, and when the pulse LC passed along the line LC2 by way of the delay element LT reaches the switch CT, the said pulse appears at the output SB (1st cycle) indicating "normal operation," under the action of the pulse applied to EC.

Cycle II.—The generator GS transmits a pulse IL along the line IL to trigger the transmission of control pulses. This pulse is unnecessary when the transmission of the control pulses is effected, for example, in relation with the synchronisation of the driving motor of the machine. A pulse IOS (cycle 2) is transmitted to the generator GS, while recording control pulses are transmitted along the lines C1 to C6 during the time IC3. The curve BP shows that these pulses are transmitted well after the punching bar 98 has started to descend. As already shown, these pulses are "mechanically" stored in the punching devices for a punching which is rendered effective only in the succeeding cycle. These pulses are applied to the inputs of the parity checking device CP1. At the commencement of the pulse IMM (which starts towards the end of the cycle II, at the end of the synchronising pulse IOS), the result of the parity check by CP1 is stored by MM and maintains one of the outputs P1M or I1M under voltage throughout the duration of the pulse IMM, which partly extends over the cycle II and partly over the cycle III.

Cycle III.—In the course of this cycle, various punching operations will be performed, in accordance with the recording control pulses transmitted during the cycle II and each of the punching devices actuated transmits a photo-electric monitoring pulse CPH through one of the lines T1 to T6 to the parity checking device CP2, one of the outputs P2 and I2 of which is then under voltage, depending upon whether the number of punching devices actuated is even or odd. If the two parity checking devices indicate "even," voltage is applied to the two inputs of the coincidence-checking circuit EP and voltage is applied to the input EC of the output switch CT through the line SP, and the pulse LC transmitted through the line LC2 to the cycle II will leave at SB, indicating correct operation of the assembly. During the punching operation of the cycle III, recording control pulses are transmited to the electromagnets of the punching devices during the time IC4 to control punching operations which will be carried out during the cycle IV. For example, it will be assumed that one of these pulses has had no effect on a latch and that the latter has remained engaged by its lever 77. This type of incident, which is impossible in principle, could however happen in the case where a control pulse has been too weak to actuate the blade 76 of an electromagnet. In this case, the number of pulses transmitted by the checking devices is lower by one unit than the number of control pulses which have been transmitted to the electromagnets of the punching mechanism. Consequently, the data supplied by the two parity checking devices are different and neither of the coincidence-checking devices EP and EI can receive an electric pulse at each of its two inputs simultaneously, in order to transmit a pulse to the input EC of the output switch. In addition, the pulses supplied by the outputs of the parity checking circuits are applied to the interrupters IT1 and IT2 to block the passage of the pulse LC transmitted through the line LC1. In the absence of voltage at the input EC of the output switch, the pulse LC transmitted through the line LC2 will appear (cycle IV) at the output SM of the output switch CT to indicate "error in operation." Likewise, a latch not engaged with its lever 77 during the upward movement of its punch or disengaged at the wrong time owing to shocks or vibrations would produce one perforation too many, which would be indicated in the same way.

The pulses LC transmitted by the generator GS at each cycle and the interrupters IT1 and IT2 make it possible to check the state of operation of the punching devices in the absence of punching operation control pulses, because if a latch is disengaged in the absence of control pulses, as described above, the parity checking circuit CP2 will supply at its output I2 a voltage indicating "odd" which is transmited to the interrupter IT1 and prevents transmission of a pulse LC through the line LC1. The pulse LC transmitted through LC2 will then appear at the output SM of the output switch and indicate an error in operation.

Of course, various modifications may be made to the embodiment just described by way of example. Thus, the photo-electric monitoring devices may be adjusted to supply at different instants during the descent of the punches "series" pulses whose parity may be checked by a simple trigger circuit. This can be readily effected with optical devices having a mechanical slit or a projected slit.

The invention is also applicable to monitoring devices analogous to those previously described, but in which the recording control pulses, instead of being sent in parallel along the connecting lines such as C1 to C6, are sent in series or even simply with time staggering. In this case, the parity checking device CP1 may consist of a trigger circuit having a symmetrical input. This possibility may be considered when the pulses are supplied, for example, by sequential scanning of a memory.

I claim:

1. In a cyclically operating recording machine comprising a plurality of punching members for punching a coded representation of a character or the like in one or several code positions on a second medium and a same plurality of punch electromagnets, each adapted to be actuated as a result of the reception of a recording control pulse, an operation checking arrangement in which an operation checking device is associated with each of the said punching members to supply a checking pulse each time that the corresponding punching member is actuated, a first parity checking device connected to receive the said control pulses at each recording cycle, and having two outputs for indicating whether the number of the control pulses received is even or odd, a second parity checking device connected to receive the said checking pulses and having two outputs for indicating whether the number of the checking pulses received is even or odd, comparing means connected to said outputs of the two parity checking devices for comparing the data supplied by the parity checking devices, and a signalling device controlled by the comparing means and responding to the non-correspondence of the data supplied by the parity checking devices and providing an output, in order to signal defective operation or to interrupt the operation of the machine.

2. An operation checking arrangement according to claim 1, comprising a pulse generator adapted to emit a signalling pulse at each cycle, an interrupting circuit provided with control inputs connected to the outputs of the said two parity checking devices and connected between the said pulse generator and the said signalling device, to block the said signalling pulse if, in the absence of recording control pulses, a particular voltage appears at one of the outputs of the said parity checking devices and to signal defective operation or to interrupt the operation of the machine.

3. In a cyclically operating recording machine comprising a plurality of punching members for punching a coded representation of a character or the like in one or several code positions on a record medium and a same plurality of punch electromagnets adapted to be independently actuated in the course of a cycle, each as a result of the reception of a recording control pulse, an operation checking arrangement in which an operation checking device is associated with each of the said punching members to supply a checking pulse each time that the corresponding punching member is actuated, this arrangement also comprising a first parity checking device connected to receive the said control pulses, a second parity checking device connected to receive the pulses supplied by the said operation checking devices, each of the said parity checking devices being provided with a first output to which a particular voltage is applied when a number of pulses received is even, and with a second output at which the said voltage is set up when the number of pulses received is odd; a first AND circuit whose inputs are connected to the "even" outputs of the two parity checking devices and a second AND circuit whose inputs are connected to the "odd" outputs of the said two devices, and a signalling device which is connected to the outputs of the two AND devices and which provides an output to signal defective operation or to interrupt the operation of the machine in the event of non-agreement between the data supplied by the two parity checking devices.

4. In a cyclically operating recording machine comprising a plurality of punching members for punching a coded representation of a character or the like in one or several code positions on a record medium and a same plurality of punch electromagnets each adapted to be actuated as a result of the reception of a recording control pulse, an operation checking arrangement in which an operation checking device is associated with each of the said punching members and supplies a checking pulse each time that the corresponding punching member is actuated, a first parity checking device connected to receive the said recording control pulses, a second parity checking device connected to receive the said checking pulses, a memory device connected to store temporarily the data supplied by said first parity checking device, comparing means connected to the outputs of said memory device and to the outputs of said second parity checking device to compare the data supplied by the parity checking devices, a signalling device controlled by the comparing means, responding to the non-correspondence of the data supplied by the parity checking devices, a pulse generator which supplies a signalling pulse at each cycle, an interrupting circuit provided with interruption control inputs connected to the outputs of the parity checking devices and connected in such a manner that the said interrupting circuit can cause said signalling device to provide an output to signal defective operation or to interrupt the operation of the machine when, in the course of a cycle, a punching member is accidentally actuated in the absence of recording control pulses.

References Cited

UNITED STATES PATENTS

| | | | |
|---|---|---|---|
| 2,909,995 | 10/1959 | Hannibal | 340—146.1 X |
| 3,331,958 | 7/1967 | Rouzier | 235—153 |

MALCOLM A. MORRISON, Primary Examiner

R. STEPHEN DILDINE, Jr., Assistant Examiner

U.S. Cl. X.R.

235—153; 340—146.1, 146.2, 190